(12) United States Patent
Monsen et al.

(10) Patent No.: US 8,277,739 B2
(45) Date of Patent: Oct. 2, 2012

(54) METHOD AND REACTOR FOR PRODUCING CARBON NANOTUBES

(75) Inventors: Bodil Monsen, Trondheim (NO); Ola Raaness, Trondheim (NO); Roar Jensen, Trondheim (NO); Kjersti Kleveland, Trondheim (NO); Steinar Prytz, Trondheim (NO); Benjamin Ravary, Trondheim (NO); Jon Arne Bakken, Trondheim (NO); Andreas Westermoen, Bergen (NO)

(73) Assignee: Sinvent AS, Trondheim (NO)

( * ) Notice: Subject to any disclaimer, the term of this patent is extended or adjusted under 35 U.S.C. 154(b) by 724 days.

(21) Appl. No.: 11/922,264

(22) PCT Filed: Jun. 16, 2006

(86) PCT No.: PCT/NO2006/000229
§ 371 (c)(1),
(2), (4) Date: Jun. 4, 2009

(87) PCT Pub. No.: WO2006/135253
PCT Pub. Date: Dec. 21, 2006

(65) Prior Publication Data
US 2009/0294273 A1    Dec. 3, 2009

Related U.S. Application Data

(60) Provisional application No. 60/690,863, filed on Jun. 16, 2005.

(30) Foreign Application Priority Data

Dec. 22, 2005  (NO) .................................. 20056149

(51) Int. Cl.
*B01J 19/08* (2006.01)
*D01F 9/12* (2006.01)

(52) U.S. Cl. .............. 422/186.03; 422/186.21; 204/173; 423/447.3

(58) Field of Classification Search ............. 422/186.21, 422/186.03; 204/173; 423/445 B, 447.3
See application file for complete search history.

(56) References Cited

U.S. PATENT DOCUMENTS

| | | | |
|---|---|---|---|
| 5,227,038 A | 7/1993 | Smalley et al. | |
| 5,298,714 A | 3/1994 | Szente et al. | |
| 6,451,175 B1 | 9/2002 | Lal | |
| 6,902,655 B2* | 6/2005 | Anazawa et al. | 204/176 |
| 2004/0241339 A1 | 12/2004 | Anazawa et al. | |
| 2005/0230240 A1* | 10/2005 | Dubrovsky et al. | 204/164 |

FOREIGN PATENT DOCUMENTS

| | | |
|---|---|---|
| CN | 1541938 | * 11/2004 |
| WO | 2004/083119 | 9/2004 |

OTHER PUBLICATIONS

Lee, S., et al. "Large Scale Synthesis of Carbon Nanotubes by Plasma Rotating Arc Discharge Technique," *Diamond and Related Materials*, vol. 11, (2002) pp. 914-917.

Bae, J., et al. "Diameter Control of Single-walled Carbon Nanotubes by Plasma Rotating Electrode Process," *Carbon*, vol. 40, (2002) pp. 2905-2911.

* cited by examiner

*Primary Examiner* — Kishor Mayekar
(74) *Attorney, Agent, or Firm* — Ladas & Parry LLP

(57) ABSTRACT

The present invention concerns a process for producing carbon nanotubes or other carbon nanostructures, e.g. cones. The process comprising evaporating/decomposing a carbon containing material in a voluminous thermal plasma generated by rotating an electric arc using an externally applied magnetic field, and condensing said evaporated/decomposed carbon containing material on surfaces or on particles in a gas flow. A reactor for performing the process is also described.

20 Claims, 19 Drawing Sheets

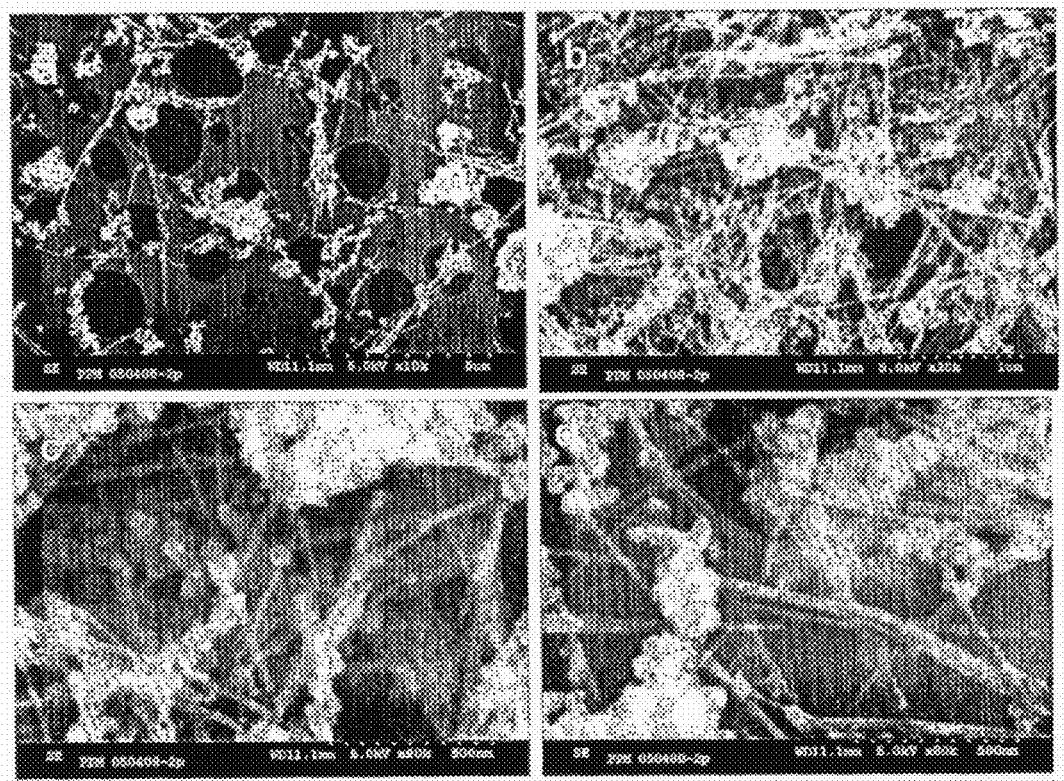

Example 1: FE-SEM images of a sample from the anode inside, cylinder part. FE-SEM-samples were made by dispersing powder in iso-propanole and put on a carbon-grid.
  a) Overview image of sample. Black areas are holes in the carbon-grid, and dark grey areas are the carbon-grid. Nanotubes together with other types of carbon particles are visible. The lengths of the nanotubes are up to about 5 μm. 10 000 x magnification.
  b) Nanotubes (d ~ 15-100 nm). 30 000 x magnification.
  c) Nanotubes (d ~ 15-100 nm). 80 000 x magnification.
  d) Nanotubes (d ~ 15-100 nm). 80 000 x magnification.

Figure 5

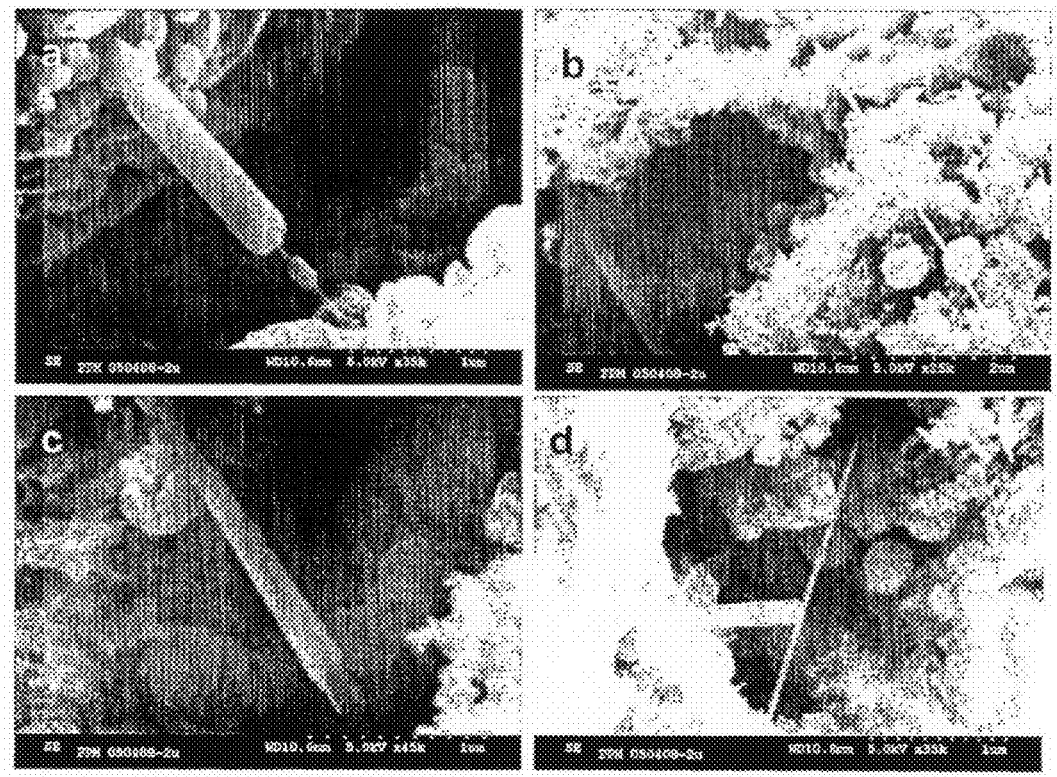

Example 1: Higher magnification FE-SEM images of the underside surface (black side) of a sample scraped off from the anode, inside, cylinder part.
  a) Nanotube attached to carbon particles on both sides. Diameter of the tube is varying along the length (d ~ 50 nm to 350 nm). Length of the tube is about 2.5 μm. 35 000 x magnification.
  b) Nanotube with d ~ 50 nm and length about 3 μm. 25 000 x magnification.
  c) Nanotube with d ~ 200 nm at the thickest and length about 2 μm. The tube has less graphene layers at the tip. 45 000 x magnification.
  d) Two nanotubes with very different size. The thickest has d ~ 200 nm and length about 0.8 μm. The thinnest has d ~ 40 nm and length about 2 μm. 35 000 x magnification.

Figure 6

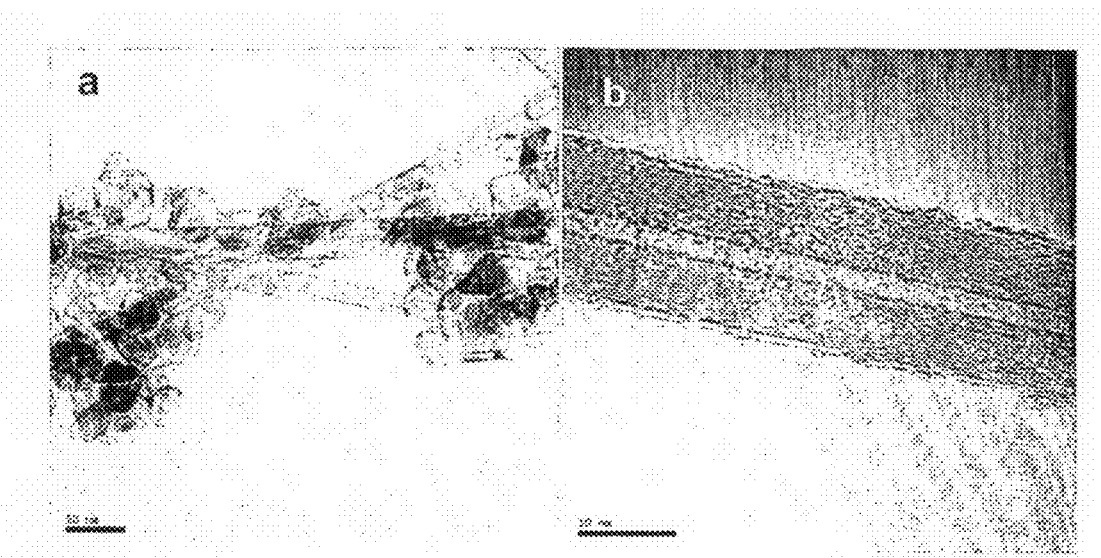

Example 1:  FE-TEM images samples from the anode (inside, sylinder part) dispersed in isopropanole and put on a carbon-grid.
a) Nanotubes with diameters around 15-20 nm, and spherical particles. The channel inside the tubes are visible. Black diffraction lines in the particles indicate that they are crystalline.
b) High magnification image of nanotube (d ~ 16 nm nm). The grapheme layers are visible and the open channel inside (d ~ 2 nm). Interlayer distance is about 0.34 nm.

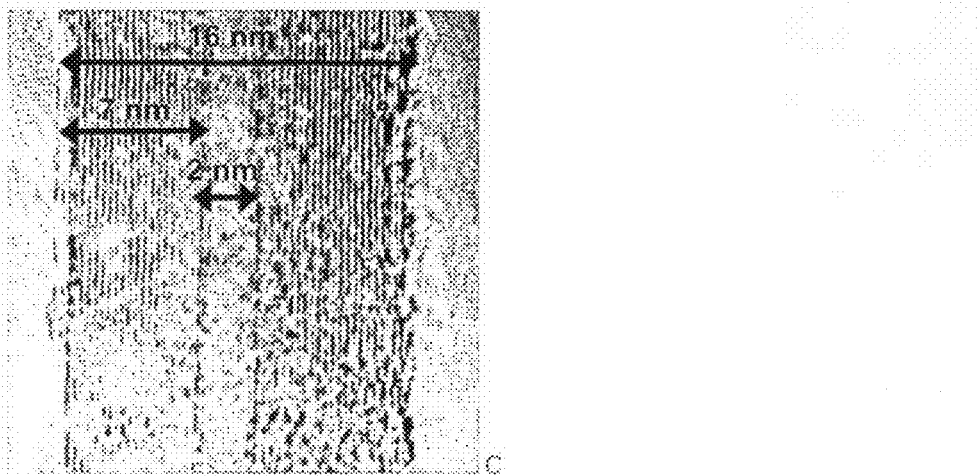

Example 1:  FE-TEM image showing a detailed image of the nanotube shown above. Diameter, wall thickness and channel diameter is indicated on the image. The number of walls is about 23 giving an interlayer distance of about 0.34 nm (as in graphite).

Figure 7

Example 2: FE-SEM images of cones and a few long carbon nanotubes from inside the anode.

Example 2: FE-TEM images of carbon nanotubes from the anode top.
The sample was dispersed and put on a carbon grid.
a) Carbon nanotubes with closed ends and diameters in the range 6-9 nm
b) Carbon nanotubes with closed ends and diameters in the range 14-30 nm
c) Carbon nanotube with closed end and diameter around 10 nm.

Example 3: FE-SEM images of carbon nanotubes
 a) Sample from the inner edge of the anode top. Carbon nanotubes with diameters in the range 10-30 nm and around 2 μm long.
 b) Sample from the inner edge of the anode top. Carbon nanotubes with diameters in the range 15-35 nm and around 2 μm long.

Example 4: FE-SEM images of a cone and carbon nanotubes.
a) The image shows a cone in a sample from the anode holes.
b) Sample from inside the anode at the top. The image shows carbon nanotubes in a high concentration.
c) Sample from inside the anode at the top. Carbon nanotubes with diameters in the range 10-20 nm and length 1-3 μm.

Example 5: FE-SEM images of carbon nanotubes from the radiation shields. The sample was put directly on a carbon tape
a) Area with very high concentration of nanotubes.
b) Higher magnification image of nanotubes in 5a), with d=15-40 nm, length~2μm Example 5: FE-SEM images of carbon nanotubes from the substrate. The sample was put directly on a carbon tape.
c) Overview of area with nanotubes.
d) Higher magnification image of nanotubes with d=10-50 nm, length~1-5 μm Example 5: FE-SEM images of carbon nanotubes from the inside cylinder part of the anode (top). The sample was put directly on a carbon tape.
e) Area with high concentration of nanotubes with d~10-50 nm, length~1-4 μm.
f) Higher magnification image of nanotubes with d~10-50 nm, length~1 μm Example 5: FB-SEM images of carbon nanotubes from the anode. The samples were put directly on a carbon tape.
g) From the anode top. Nanotubes with d~30 nm, length~1-5 μm.
h) From the anode inside, cylinder part. Carbon cone with d~350 nm, length~1 μm.

METHOD AND REACTOR FOR PRODUCING CARBON NANOTUBES

CROSS-REFERENCE TO RELATED APPLICATIONS

This application is a U.S. national phase entry of International Application PCT/NO2006/000229 and claims priority from U.S. provisional application 60/690,863 filed on Jun. 16, 2005, the contents of which are herein incorporated by reference.

INTRODUCTION

The present invention concerns a method for production of carbon nanotubes or other carbon nanostructures, e.g. cones.

BACKGROUND

There exist a number of methods for production of carbon nanostructures and carbon nanotubes. These may be divided in two main categories; high temperature methods and low temperature methods. Most of the high temperature methods are based on sublimation of carbon under an inert atmosphere, such as the electric arc discharge process, the laser ablation method and the solar technique. Low temperature methods are e.g. chemical vapour deposition (CVD) using the catalytic decomposition of hydrocarbons, gas phase catalytic growth from carbon monoxide, production by electrolysis, heat treatment of polymer, low temperature in situ pyrolyse or in situ catalysis. The main methods are further described below.

CVD (Chemical Vapour Deposition) is a method where carbon nanotubes are produced from gas phase by growing carbon nanotubes on a substrate by using large amounts of catalyst at a low temperature (600-1000° C.). The carbon nanotubes produced contains defects, resulting in bends on the structures. Also, the catalyst is present in the resulting carbon nanotubes in various amounts, from 50% and as low as 1-10%.

Arc methods are plasma methods where a DC electric arc discharge is established between an anode and a cathode only a few millimeters apart. This creates a rather small plasma arc in the area between the electrodes. Carbon evaporated from the carbon based (e.g. graphite) anode recondenses on the cathode in the form of a deposit containing carbon nanotubes. In the original arc method published by T. W. Ebbesen, Nature 358 (1992) no externally applied magnetic field generated by permanent magnets or electromagnets was used, and no recirculation of evaporated carbon could occur. This arc method is only suited for small-scale production of carbon nanotubes in arc reactors operating at very low current and power levels—typically a few kW. Upscaling to higher power levels by increasing the arc current and/or the electrode diameter seems not feasible because the deposited carbon nanotubes will be re-evaporated from the cathode.

In the conventional arc discharge method there is a point-to-point discharge between the electrodes. In order to improve this method, the cathode and the anode were shaped as a plate at the tip to create a plane-to-plane micro-discharge, and somewhat increase the plasma volume, published by Lee S. J. et al.: "Large scale synthesis of carbon nanotubes by plasma rotating arc discharge technique", Diamond and Related Materials, 11, 2002, pages 914-917. Lee S. J. et al. correctly states: "Conventional arc discharge is a discontinuous and unstable process, and it can not produce the high quality of carbon nanotube in mass production. The nanotubes are produced on the cathode surface and the electrode spacing is not constant, so the current flow is not uniform and the electric fields are non-homogenous." To overcome this the anode was mechanically rotated in order to create centrifugal forces so that the carbon vapour did not deposit on the cathode, but was transferred out of the plasma region and condensed on a collector at temperatures between 900-1100° C. This may enable continuous production, but still this method operates at very low power levels, in the range 1.6-3.6 kW, and is best suited for small-scale production. The mechanical rotation of the anode will not rotate the arc to any extent. However, electrode rotation is normally performed in order to obtain uniform electrode wear. Experimental results with a mechanical rotating anode is presented in Bae J. C. et al., "Diameter control of single-walled carbon nanotubes by plasma rotating electrode process"; Carbon, vol. 40, number 15, 2002, pages 2905-2911.

Further examples of electric arc methods are described in e.g. U.S. Pat. No. 5,277,038 and U.S. Pat. No. 6,451,175. In U.S. Pat. No. 6,451,175 the cathode is longitudinally vibrated to enhance the carbon nanotube deposition on the cathode.

Magnetic fields generated by permanent magnets or coils are introduced in other publications in order to overcome the stability problem. In particular the inventors of the European patent application EP1577261A (ANAZAWA, KAZUNORI) in claim 1 give detailed instructions on how to locate magnets and create a field stabilizing the arc. In addition, e.g. US patent application US20040084297, U.S. Pat. No. 6,902,655 (ANAZAWA et al) and JP08048510 (MIENO et al) "improve the efficiency" of the arc method, either by increasing the charged particle collision frequencies or by blowing the plasma away from the cathode. Again, upscaling to larger production units seems not feasible. Especially, EP1577261A mentions a drum/plate formed cathode which is rotated in order to enable scraping off the nanotubes continuously by a scraper at the cathode side, below the arc. This also provides even wear/abrasion of the electrodes. The magnetic field aims at stabilizing the arc between the anode and the cathode in order to avoid the arc to follow along the first part of the cathode rotation.

WO 2004/083119 describes a plasma method for continuous production of carbon based nanotubes, nanofibres and other nanostructures. Carbon precursor, catalyzer and carrier plasma gas are introduced in the reaction zone where the carbon precursor (preferably solid carbon particles) is vaporized. The hot plasma in the reaction zone is generated by arcs established by connecting an AC power source to two or three carbon electrodes. The gas-vapour mixture is then guided through a nozzle and into a quenching zone for nucleation. This apparatus bears a close resemblance to traditional plasma torches used for e.g. plasma spraying of refractory coatings, in which case evaporation of the particulate feedstock is not desired. The main problem with this method is that no recirculation of feedstocks and products from the quenching zone occurs.

SUMMARY OF THE INVENTION

The present invention is conceived to solve or at least alleviate the problems identified above. Specifically, an object of the invention is to provide a process for production of carbon nanotubes and other carbon nanostructures. The process is suited for up-scaling to continuous or semi-continuous mass production.

In a first aspect the invention provides a process for producing carbon nanotubes or other carbon nanostructures, e.g. cones, comprising evaporating/decomposing a carbon containing material in a voluminous thermal plasma generated by rotating an electric arc by using an externally applied magnetic field, and condensing said evaporated/decomposed carbon containing material on surfaces or on particles in a gas flow. Said carbon containing material may preferably be recirculated through the voluminous plasma. The surfaces can for example be an electrode or a substrate.

In a further embodiment positioning and rotating the arc is achieved by adjusting a distribution, direction and strength of the applied magnetic field. This embodiment avoids a solution where the magnets are arranged inside the hot reactor, which require cooling of the magnets due to the high temperature in the reactor and especially in the plasma field. Magnets on the outside are protected from plasma heat. Also, mechanical rotation of one or both electrodes as described in the arc method publications mentioned above, will not provide rotation of the electric arc.

The carbon containing material may be in gas, liquid or solid state, and may be selected from the group consisting of carbon black, graphite powder, coal, natural gas, hydrocarbons and oils. The carbon containing material may alternatively be provided by adding or by evaporation of carbon containing electrodes. A catalyst may be added together with said carbon containing material or with the applied plasma gas or applied on said surfaces. The catalyst may be selected from the group consisting of Ni, Co, Fe, Y, salts and organometallic compounds of Ni, Co, Fe, Y, suspensions of Ni, Co, Fe, Y and said salts and said compounds and combinations thereof.

Hydrogen, helium, nitrogen, argon, carbon monoxide or mixtures thereof, or a chemical substance (preferably a gas) producing one or more of these gases upon heating, may be used as plasma gas.

The electric arc is provided between an electrode and a hollow counter-electrode, wherein the electrodes are axially arranged facing each other. The counter-electrode is provided with holes allowing passage and recirculation of gases and particles.

In a second aspect the invention provides a reactor for producing carbon nanotubes or other carbon nanostructures, e.g. cones, by the process according to claim 1, comprising an electrode and a hollow counter-electrode, wherein the electrodes are axially arranged facing each other, and at least one magnet.

The counter-electrode may be a tube or a tube with a part of it as a conical shape. The counter-electrode may also be provided with holes.

In a further embodiment at least one magnet or a part of a single magnet is arranged in a lower part of the reactor, below an arc area, and at least one magnet or a part of a single magnet is arranged in an upper part of the reactor above the arc area. Magnets may be electromagnets (e.g. magnet coil) or permanent magnets.

The reactor may also be provided with a blowing or a scraping mechanism for removing the carbon nanotubes formed on the electrodes or substrate. The scraping mechanism may for example be provided by a rotatable counter-electrode or a rotatable scraping mechanism. The slow mechanical rotation only provides removal of produced carbon nanomaterial from the electrode. The reactor may further include at least one injection lance or injection port.

BRIEF DESCRIPTION OF DRAWINGS

Embodiments of the present invention will now be described with reference to the following drawings, where

FIG. 5a)-d) shows FE-SEM images of a sample from the anode inside, cylinder part from experiment 1;

FIG. 6 a)-d) shows higher magnification FE-SEM images of the underside surface (black side) of a sample scraped off from the anode, inside, cylinder part from experiment 1;

FIG. 7 a)-c) shows FE-TEM images samples from the anode (inside, cylinder part) from experiment 1;

DETAILED DESCRIPTION

The growth mechanism for nanotubes is not fully understood at the present time. However, there are several theories presented in the literature. The growth mechanism will depend on the experimental conditions and especially whether there is a catalyst present or not. Higher temperatures during growth give fewer defects in the nanotubes. Literature also reports that an electric field influences the growth of carbon nanotubes.

The growth of carbon nanotubes on a catalyst particle is believed to happen by condensation of carbon from a gaseous phase on the interface between the metal phase and the carbon phase. Solubility of carbon in the metal phase is an important parameter because the carbon can also diffuse inside the metal particle to the interface and condense there. The tube will grow by continuous condensation on the interface, and both MWNT (multi wall nanotubes) and SWNT (single wall nanotubes) can grow. The size of catalyst particle influences on the resulting tube diameter.

Without catalyst present the growth mechanism is more uncertain. The tube can either grow by condensation of gaseous carbon on the tube tip or the tube bottom. Another theory is that the tube grows by diffusion of defects from carbon particles to the tube, giving a net mass transport and thereby tube growth. Only MWNT have been observed to grow without a catalyst.

Figure 3:
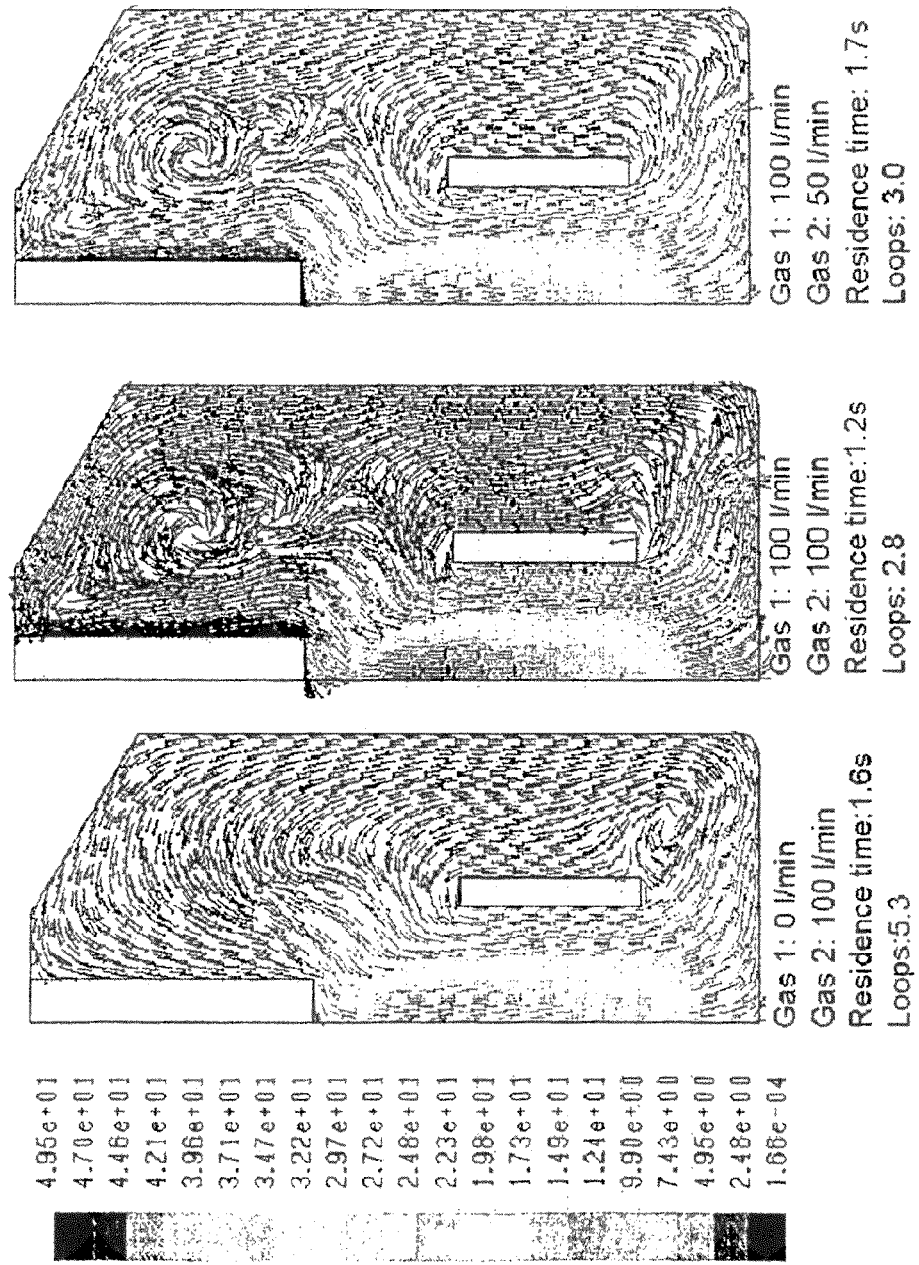
FIG. 3 shows modelled velocity vector distributions of different gas flows in a reactor according to an embodiment of the invention.

Recirculation of gas flow in the reactor will give carbon particles or gaseous carbon compounds a second chance to pass through the plasma region, and will thus give more complete evaporation or dissociation of the carbon containing feed-stock. In other words: In the present invention recycling of the gas stream allows prolonged residence times in the high temperature region, where typical temperatures are in the range 5000-50000 K. According to extensive computational fluid dynamics (CFD) simulations, typical residence times are 1000-2000 ms corresponding to 2-6 loops through the arc plasma and around the tubular anode. The degree of recirculation depends on the reactor geometry, the arc current, the externally applied magnetic field and the plasma gas feeding rates. Example embodiments of modelled velocity vectors of the reactor for different plasma gas feeding rates are shown in FIG. 3.

In the present invention, a thermal plasma is primarily used as a heat source for evaporating solid carbon or dissociation of gaseous carbon compounds. A thermal plasma is a gas (of any kind including carbon or metal vapours) consisting of neutral atoms, positively charged ions and negative electrons. The concentrations of electrons and ions are high enough to make the plasma electrically conducting. In thermal plasmas electrons and ions have the same temperature—typically 5.000-50,000 K.

The fact that a plasma conducts electricity makes it possible to move, guide and confine the plasma (e.g. rotate the plasma or generate a plasma jet) by means of magnetic fields. These may be produced by the arc itself ($B_{arc}$) or by external magnets or coils ($B_{ext}$).

In the present invention the electric arc is rotated by electromagnetic forces $J \times B_{ext}$ due to interaction between the arc current J and the specially designed externally applied field $B_{ext}$. The rotating electric arc creates a conical shaped plasma, expanding from the cathode against the anode. As mentioned earlier, rotation of an electric arc can not be achieved by mechanical rotation of one or both electrodes. The vertical position of the arc in the reactor is controlled by adjusting the direction and magnitude of $B_{ext}$ in the arc region. Recirculation is mainly the result of electromagnetic forces $J \times B_{arc}$ due to interaction between the rotating arc and its own magnetic field $B_{arc}$.

Figure 4:
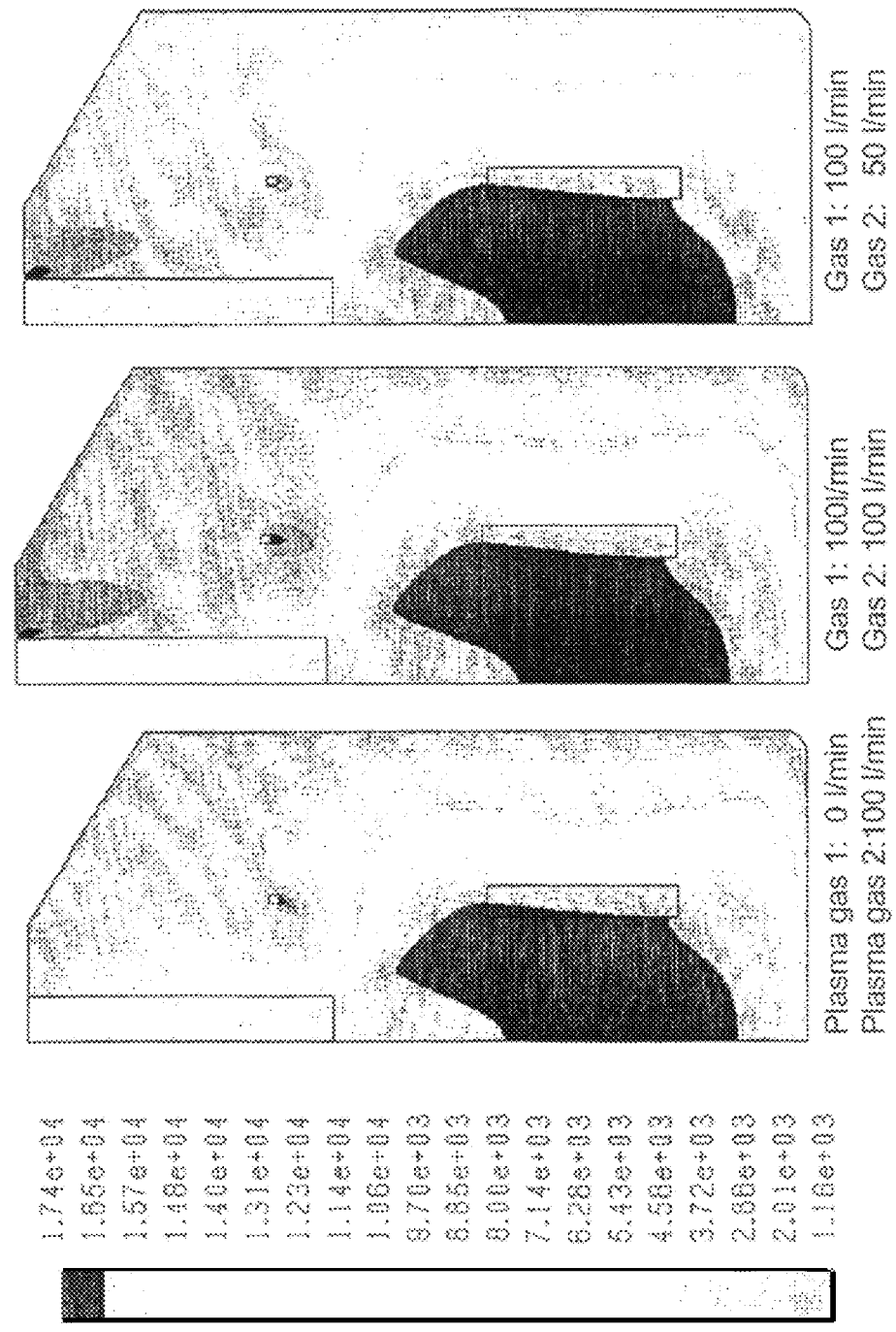
FIG. 4 shows modelled temperature distributions of a reactor according to an embodiment of the invention for different plasma gas flows.

The evaporated carbon will either condense on reactor surfaces, such as an electrode and a substrate, or the carbon will condense directly in the gas-flow (in-flight). If a catalyst is introduced in the feed, the carbon condensation in the gas-flow will be facilitated because the nanotubes can grow on flowing catalyst particles. The temperature in the condensing zone must be lower than 4000° C. that is the sublimation temperature for carbon. If a catalyst is used, the temperature must be below the boiling point of the catalyst. The optimal temperature in the condensing zone depends on the residence time. The temperature inside the reactor in the present examples is measured in 4 different places; below the substrate surface and at the inner reactor wall (top, middle, and bottom). These temperatures are mainly used for controlling the process, and do not represent the temperature in the condensing zone. The thermal plasma is the system's heat source with very high temperature (5000-50000 K), and the real temperature on the electrodes and in the gas stream is not measured. However, modelling give some indications of the temperature profile in the reactor. Examples of modelled temperature profiles of the reactor for different plasma gas feeding rates are shown in FIG. 4.

In principle, any carbon containing material can be injected as the carbon source. Possible feedstock materials are: carbon black, graphite powder, coal, natural gas, hydrocarbons, and oils. Catalyst materials can be pure metals like Ni, Co, Fe, Y, salts or organometallic compounds of these metals, suspensions of these compounds/metals, or combinations of them. The carbon containing material is injected through 1-3 injection lances in the reactor top. It is also possible to inject the carbon containing material in the gas flow around or through the electrode. The catalyst can be injected the same way as the carbon containing material, either together in the same injection point, or in separate injection points.

Reactor Design

Figure 1:
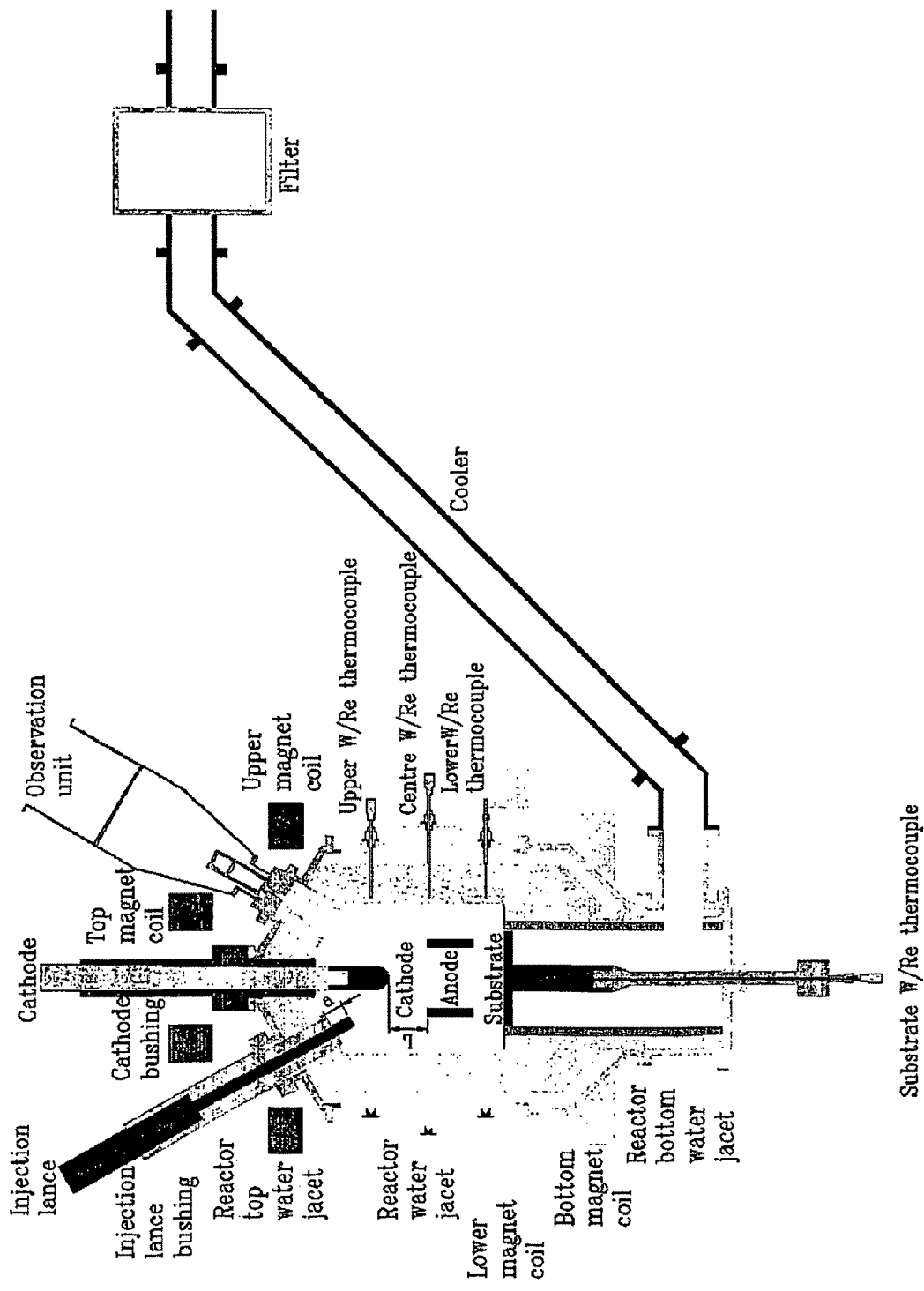
FIG. 1 shows a schematic diagram of a reactor according to an embodiment of the invention.

A preferred embodiment of a possible reactor design operating on DC current is shown in FIG. 1. A top part and a bottom part with inlet for current and gas/solid feedstock is shown in FIG. 1.

An evaporation chamber and a growth substrate with controlled cooling and changeable distance from an arc zone is arranged in the central part of the reactor. Several spare inlet ports for introduction of various reaction components are also arranged. The reactor is dimensioned to allow operation at reduced pressures down to 0.1 bara, but can also be operated at higher pressures up to 3 bara.

Magnet coils are provided to control the arc's rotational movement as well as the arc's vertical position in the reactor as explained above. In the embodiment of FIG. 1, there are four independent DC powered magnet coils mounted around the reactor at different levels from top to bottom that give flexibility to control the arc with respect to the arc's rotation and vertical position relative to the electrodes. The arc current is in this embodiment supplied by a DC power source connected between the electrodes, and the arc burning between these electrodes is rotated by the externally applied magnetic field controlled by the magnet coils. The rotational electromagnetic force is given by the vector product $J \times B_{ext}$ of the arc current J and the externally applied magnetic field $B_{ext}$.

The externally applied magnetic field $B_{ext}$ is in the preferred embodiment generated by two or more (DC powered) magnet coils situated outside the reactor walls. $B_{ext}$ is thus superposed on the arc's own (self) magnetic field $B_{arc}$ which is directly proportional to the arc current, whereas $B_{ext}$ is determined by the currents flowing through the magnet coils and their relative positions (with respect to the electrodes or arc zone). $B_{arc}$ and $B_{ext}$ can therefore be chosen independently of each other by adjusting the arc current and the coil currents, respectively.

Rotation of the arc provides a voluminous thermal plasma having a volume in the space between the electrodes and inside the hollow anode, substantially larger than the volume of the current-carrying core of the arc, i.e. larger than the volume of a free-burning uncontrolled arc with the same length and current.

The rotational speed of the arc is measured to be from 1000 to above 3000 revolutions per second and depends on the above mentioned product $J \times B_{ext}$ and the type of plasma gas used.

It is also possible to create the electric arc by using AC power. Rotation of the arc generating the voluminous plasma is in this alternative embodiment accomplished by providing AC power of the same frequency and phase to both the arc electrodes and magnet coils.

In an even further embodiment the electric arc is generated by DC power, whereas permanent magnets are provided with a magnetic field strength and in a configuration enabling generation of the voluminous plasma.

The anode is tube-shaped and normally with a flat top, and is made of graphite. The diameter increase into a cone-shape on the bottom of the anode, and holes are made to allow gas-flow and recirculation. The design of the conic part with the holes can be varied according to the desired flow pattern. The diameter of the anode can in the embodiment of FIG. 1 be varied between 10-35 cm. The smallest and largest diameters are limited by the rector size and the desired recirculation of gas and particles. The cathode is rod-shaped with a diameter of 5 cm, with either a flat or a rounded tip and made of graphite. The cathode material can in principle be made of other thermionically emitting and conducting materials than graphite, such as e.g. wolfram, but use of other materials will give metal traces in carbon product which is avoided by use of graphite. The cathode and anode are situated axially opposing each other. The vertical distance between the electrodes may be varied according to the size of the reactor. In the present embodiment this distance may be varied between 0-25 cm. By changing the anode design, it may be increased to 45 cm in the reactor embodiment used in the experiments. In the experiments described later, the electrode distance was 10 cm. There is also possibility of positioning of the cathode inside the anode (negative distance). It is the distance between the electrodes and the diameter of the anode that defines the extension of the voluminous thermal plasma.

In the design of industrially sized reactors, the distances given above can be increased above these limits. The distances will be determined by the production rate desired and the corresponding electric power input required for the scaled-up reactor.

Hydrogen, helium, nitrogen, argon, carbon monoxide or mixtures thereof, or a chemical substance (preferably a gas) producing one or more of these gases upon heating, may be used as the plasma gas.

The present design has been modified and is being modified based on CFD calculations giving the desired recirculation of gas and particles.

The reactor in FIG. 1 is designed as a versatile unit, where it is easy to modify and to change growth parameters. Arc current, arc length and arc movement are adjustable and carbon precursors are allowed to be introduced directly into the arc zone. The reactor is approximately symmetric facilitating computational fluid dynamic (CFD) calculations, which is an important tool to understand and optimise conditions for the growth of carbon nanotubes.

The CFD work focused on developing consistent and relatively simple simulation models for the reactor: the so-called Source Domain (SD) model and the more sophisticated Magneto Fluid Dynamic (MFD) model. Special attention has been given to model the arc zone. In the SD model the arc is assumed to rotate fast enough to be able to account for the arc zone as a void frustum with a thickness equal to the arc thickness. A momentum source representing the electromagnetic Lorentz forces, and a heat source corresponding to evenly distributed Ohmic heating power in the arc, was derived based on this simplification.

The reactor is designed for continuous production and the product may be removed continuously or intermittently by blowing or by a scraping mechanism or by collection in a filter. The scraping mechanism may be rotatable, and may be achieved by rotating the anode itself. The slow mechanical rotation only provides removal of produced carbon nanomaterial from the electrode Further details of the apparatus used is shown in FIGS. 13-16 wherein the arrangement of the electrode (cathode) 11, the counter electrode (anode) 12 and substrate 3 are shown on an enlarged scale, showing in particular a scraping mechanism 4, a blowing mechanism 5, rotatable counter electrode 6, an outlet chamber 8, reactor chamber 9 and holes 10 in the counter electrode for passage and recirculation of gases and particles.

EXPERIMENTAL

Five experiments with some variations in experimental conditions are presented. The variables are injection time, injection rate temperature and type of plasma gas. Experiment 1-3 have long injection times (84-93 min) and experiment 4 have short injection time (10 min). A $H_2/Ar$ mixture was used as plasma gas in experiment 3, and He was used in experiment 1, 2, 4 and 5. A methane injection rate of 2.4-2.5 l/min was used in the experiments 1-4, while a rate of 4.9 l/min was used in experiment 5. All experiments used Ar during heat-up of the reactor. Other experimental parameters are given in table 1.

Figure 2:
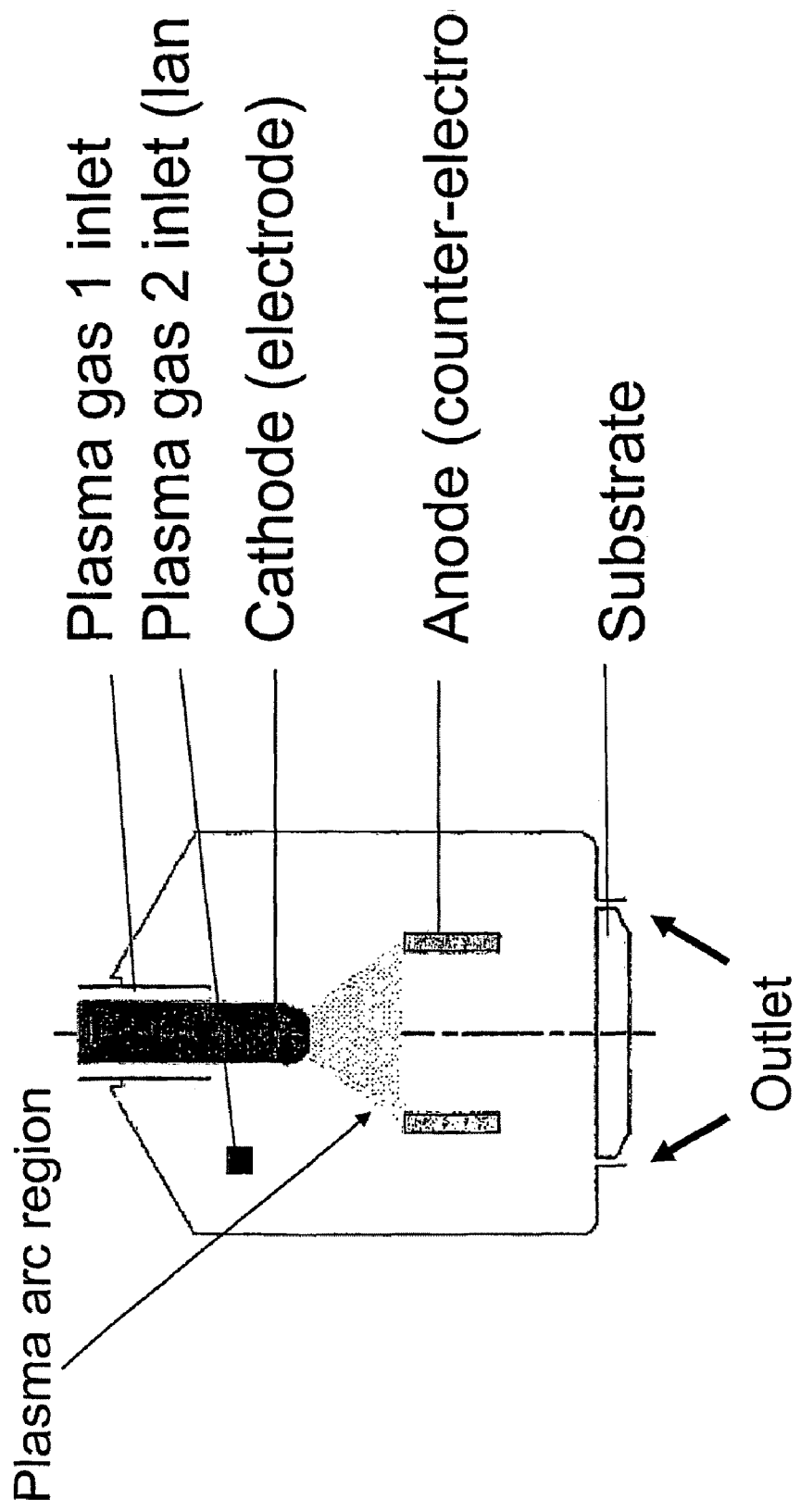
FIG. 2 shows a schematic diagram of a reactor with plasma gas inlets, cathode, anode and substrate according to an embodiment of the invention.

A drawing of the reactor is given in FIG. 1. The drawing shows the position of the injection lance during methane injection, position of the electrodes and the magnet coils used. FIG. 2 shows a schematic drawing of the reactor in FIG. 1 indicating the cathode (electrode) with plasma gas inlet 1, plasma gas inlet 2 (lances), anode (counter-electrode), substrate and gas outlet as used in the experiments in Table 1.

The reactor was heated up using argon by increasing the plasma current gradually up to maximum 900 A at a reactor pressure of 1 bara. When the reactor temperature reached approximately 1350° C., it was switched to the plasma gas to be used during injection (He or $H_2/Ar$) and the pressure was reduced to 0.6 bara. The experiments were run with only two magnet coils, the top coil and the bottom coil. The plasma arc was stabilized during the heat up by adjusting the current through the magnet coils and the plasma arc current. In order to observe the arc stability, the plasma arc was monitored and recorded by a video camera through the observation unit during the whole experiment.

Methane was injected continuously in one injection period of 10-93 min. The methane flow rate was adjusted to 2.4-2.5 l/min corresponding to 1.2 g C/min in experiments 1-4 while a double methane injection rate was used in experiment 5. During methane injection the feed rate of plasma gas 1 was 10-11 l/min around the cathode and the feed rate of plasma gas 2 was 51-102 l/min through the injection lance. Some plasma gas was also used for gas purging through the observation unit and small amounts at pressure probes. The current through the magnet coils were adjusted to give a stable plasma arc. The plasma arc current was in the range 650-905 A.

After the reactor was cooled down the reactor was demounted and carbon samples were taken out at different locations in the reactor. The carbon samples were weighed and characterized by FE-SEM (Hitachi S-4300-SE) and FE-TEM (JEOL 2010 FEG TEM). The yield for each experiment is given in table 1.

TABLE 1

| Conditions during the injection period (from logged data). | | | | | |
|---|---|---|---|---|---|
| | Experiment 1 | Experiment 2 | Experiment 3 | Experiment 4 | Experiment 5 |
| Injection time | 92 min | 93 min | 84 min | 10 min | 10 min |
| Total amount of carbon injected | 108.3 g | 115.8 g | 100.1 g | 12.3 g | 25.3 g |
| Yield | 26.1% | 19.6% | 12.3% | 50.0% | 19.0% |

TABLE 1-continued

Conditions during the injection period (from logged data).

| | Experiment 1 | Experiment 2 | Experiment 3 | Experiment 4 | Experiment 5 |
|---|---|---|---|---|---|
| Plasma arc current | 650-700 A | 890-905 A | 685-720 A | 808-851 A | 810 A |
| Plasma arc voltage | 156-149 V | 145-155 V | 125-150 V | 160 V | 170 V |
| Current through top magnet coil | 355 A | 405 A | 503 A | 501 A | 501 A |
| Current through bottom magnet coil | 407 A | 511 A | 147 A | 410 A | 408 A |
| Plasma gas during injection | He | He | 16/84 $H_2$/Ar | He | He |
| Gas flow of plasma gas 1 | 11 l/min | 10 l/min | 10 l/min | 10 l/min | 10 l/min |
| Gas flow of plasma gas 2 | 96 l/min | 100 l/min | 51 l/min | 102 l/min | 102 l/min |
| Methane gas flow through injection lance | 2.4 l/min | 2.5 l/min | 2.5 l/min | 2.4 l/min | 4.9 l/min |
| Reactor temperature | 1800-1970° C. | 1975-2100° C. | 1935-2045° C. | 1980-2039° C. | 1930-2100° C. |

Most of the carbon was found inside the anode, in the filter and on the substrate. The carbon deposits inside the anode were soft for short retention time and hard for long retention time, and could be removed as large flakes. The flakes were silver-coloured on the surface and black on the backside. The carbon deposit in the filter was light and fluffy. On the outside surface of the anode there was only a very thin layer of carbon that could be scraped off. The cathode had some carbon deposits at the tip and around the upper part. There were not much carbon deposited in the reactor top, and the reactor top was therefore not usually dismounted after the experiments. FE-SEM and FE-TEM images of the samples from the experiments above are shown and commented in FIGS. 5-12 and below.

FIG. 5a)-d) shows FE-SEM images of a sample from the anode inside, cylinder part from experiment 1. FE-SEM-samples were made by dispersing powder in isopropanole and put on a carbon-grid. FIG. 5a): Overview image of sample. Black areas are holes in the carbon-grid, and dark grey areas are the carbon-grid. Nanotubes together with other types of carbon particles are visible. The lengths of the nanotubes are up to about 5 µm. 10000× magnification. FIG. 5b): Nanotubes (d~15-100 nm). 30000× magnification. FIG. 5c): Nanotubes (d~15-100 nm). 80000× magnification. FIG. 5d): Nanotubes (d~15-100 nm). 80000× magnification.

FIG. 6a)-d) shows FE-SEM images of the underside surface (black side) of a sample scraped off from the anode, inside, cylinder part from experiment 1. FIG. 6a): Nanotube attached to carbon particles on both sides. Diameter of the tube is varying along the length (d~50 nm to 350 nm). Length of the tube is about 2.5 µm. 35000× magnification. FIG. 6b): Nanotube with d~50 nm and length about 3 µm. 25000× magnification.

FIG. 6c): Nanotube with d~200 nm at the thickest and length about 2 µm. The tube has less graphene layers at the tip. 45000× magnification. FIG. 6d): Two nanotubes with very different size. The thickest has d~200 nm and length about 0.8 µm. The thinnest has d~40 nm and length about 2 µm. 5000× magnification.

FIG. 7a)-c) shows FE-TEM images samples from the anode (inside, cylinder part) of experiment 1 dispersed in isopropanole and put on a carbon-grid.

FIG. 7a): Nanotubes with diameters around 15-20 nm, and spherical particles. The channel inside the tubes is visible. Black diffraction lines in the particles indicate that they are crystalline. FIG. 7b): High magnification image of nanotube (d~16 nm). The grapheme layers are visible and the open channel inside (d~2 nm). Interlayer distance is about 0.34 nm. FIG. 7c) is FE-TEM image showing a detailed image of the nanotube shown in FIG. 7a)-b). Diameter, wall thickness and channel diameter is indicated on the image. The number of walls is about 23 giving an interlayer distance of about 0.34 nm (as in graphite).

Figure 8:
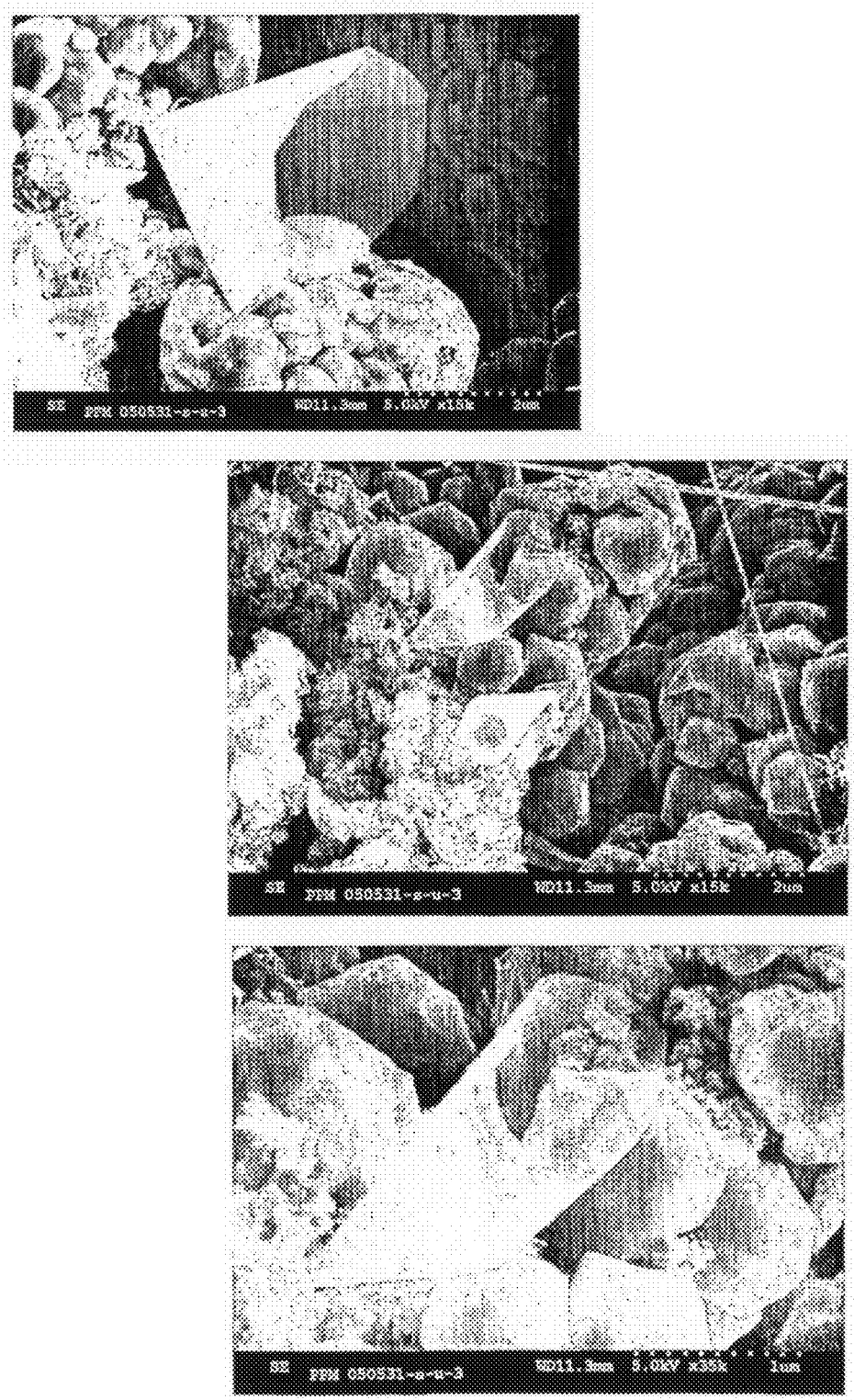
FIG. 8a)-c) shows FE-SEM images of cones and a few long carbon nanotubes from inside the anode from experiment 2.

FIG. 8 shows FE-SEM images of cones and a few long carbon nanotubes from inside the anode from experiment 2.

Figure 9:
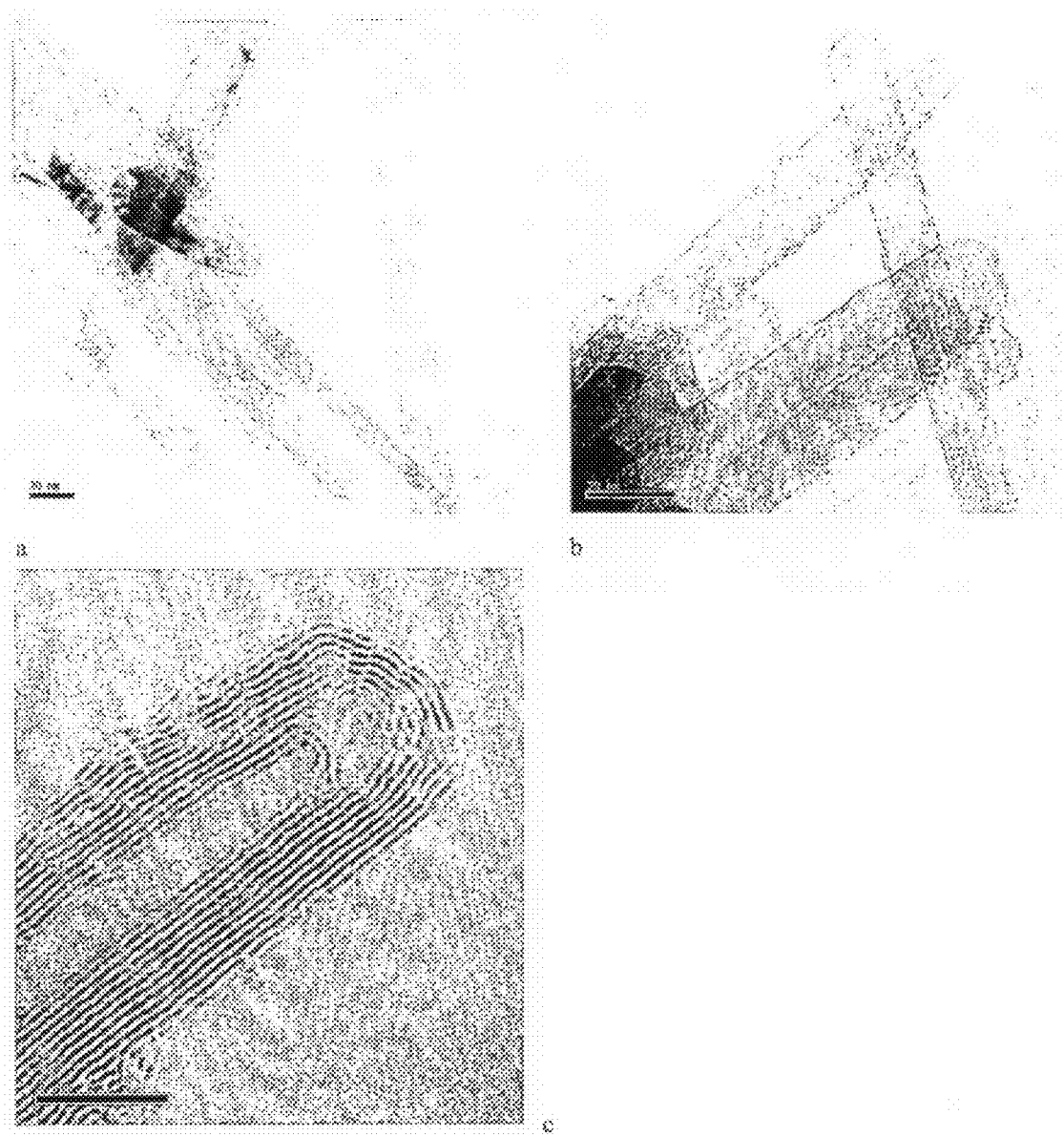
FIG. 9a)-c) shows FE-TEM images of carbon nanotubes from the anode top from experiment 2.

FIG. 9 a)-c) are FE-TEM images of carbon nanotubes from the anode top of experiment 2. The sample was dispersed and put on a carbon grid.

FIG. 9a): Carbon nanotubes with closed ends and diameters in the range 6-9 nm. FIG. 9b): Carbon nanotubes with closed ends and diameters in the range 14-30 nm. FIG. 9c): Carbon nanotube with closed end and diameter around 10 nm.

Figure 10:
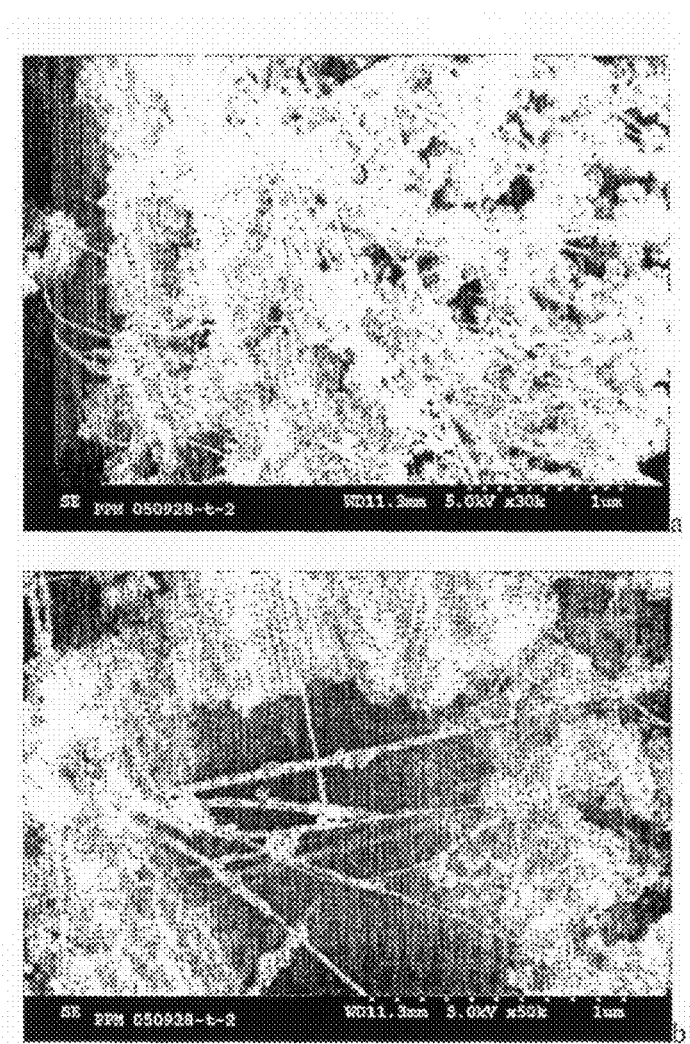
FIG. 10a)-b) shows FE-SEM images of carbon nanotubes from example 3.

FIG. 10 a)-b) are FE-SEM images of carbon nanotubes of experiment 3.

FIG. 10a): Sample from the inner edge of the anode top. Carbon nanotubes with diameters in the range 10-30 nm and around 2 µm long. FIG. 9b): Sample from the inner edge of the anode top. Carbon nanotubes with diameters in the range 15-35 nm and around 2 µm long.

Figure 11:
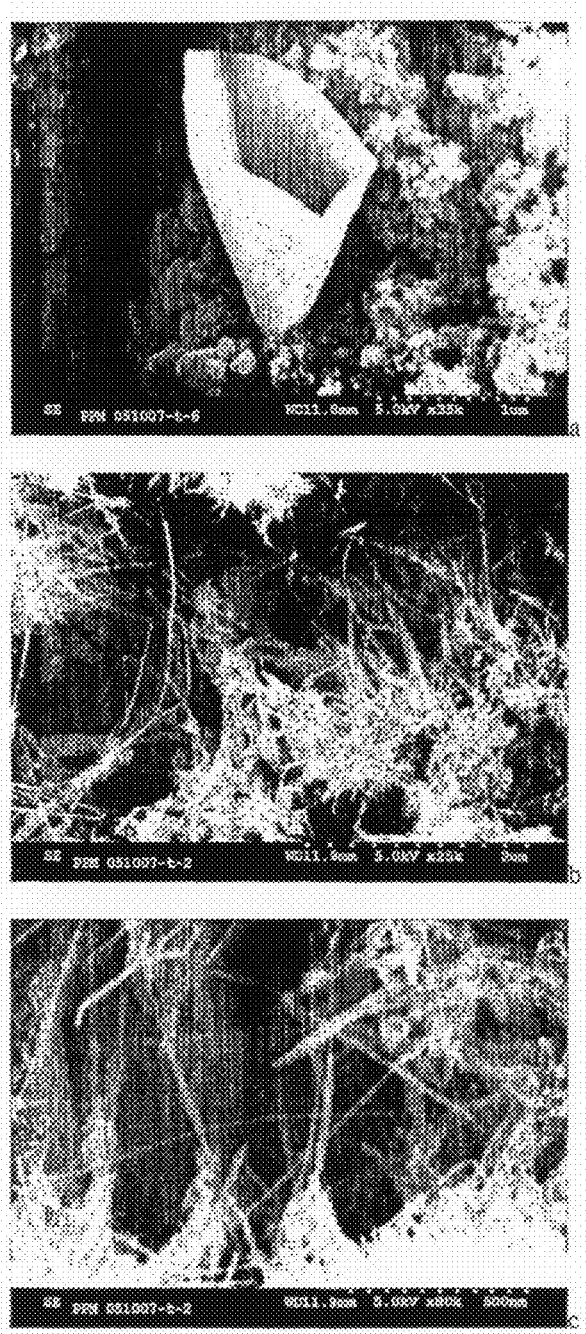
FIG. 11a)-c) shows FE-SEM images of a cone and carbon nanotubes from example 4.
Figures 12A, 12B:
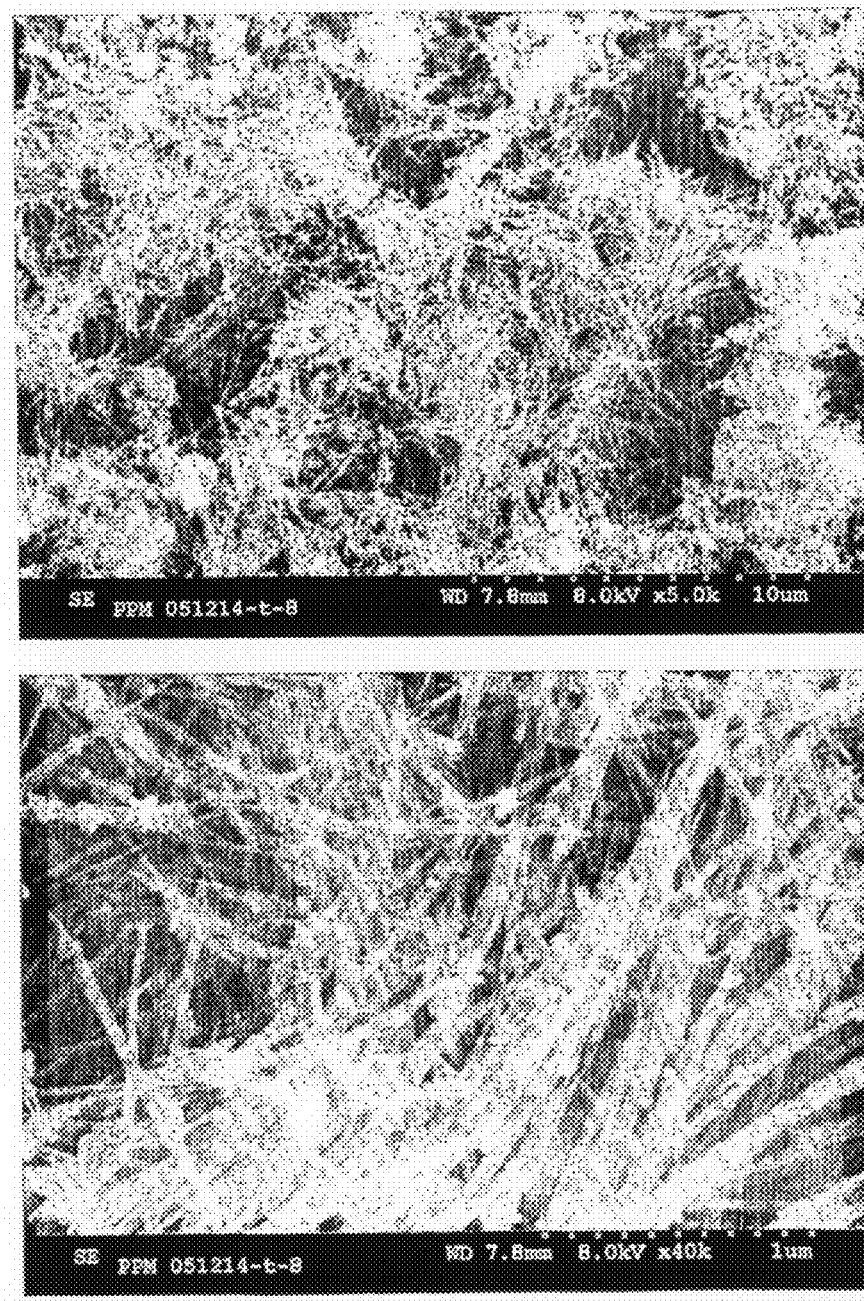
FIG. 12a)-h) shows FE-SEM images of carbon nanotubes and a cone from example 5.
Figure 12C:
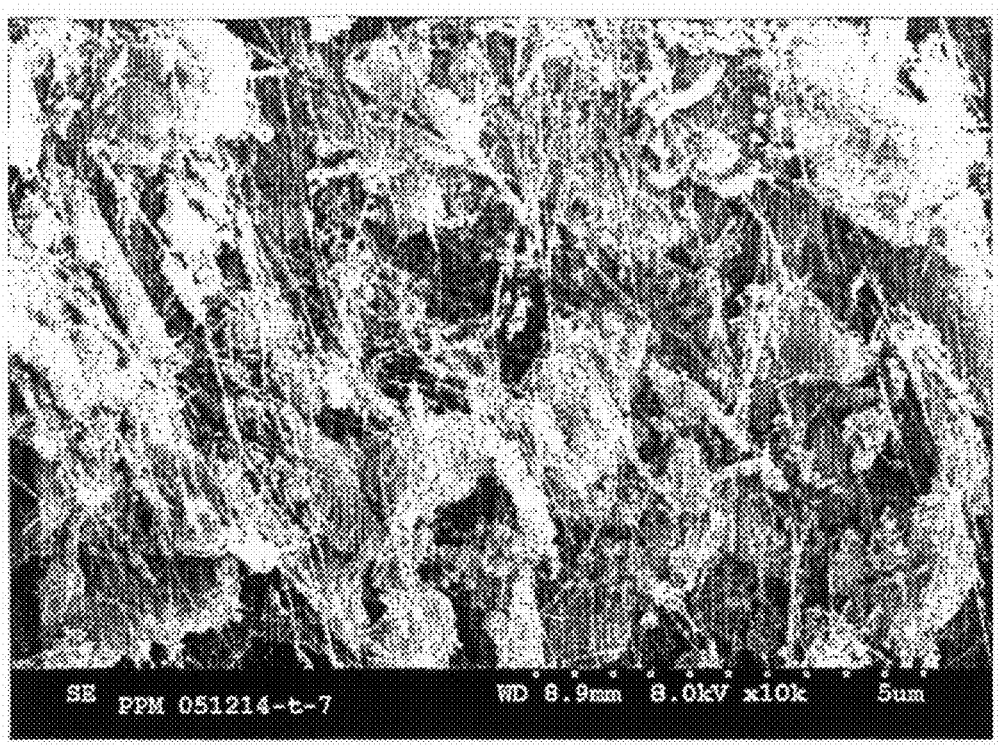
Figure 12D:
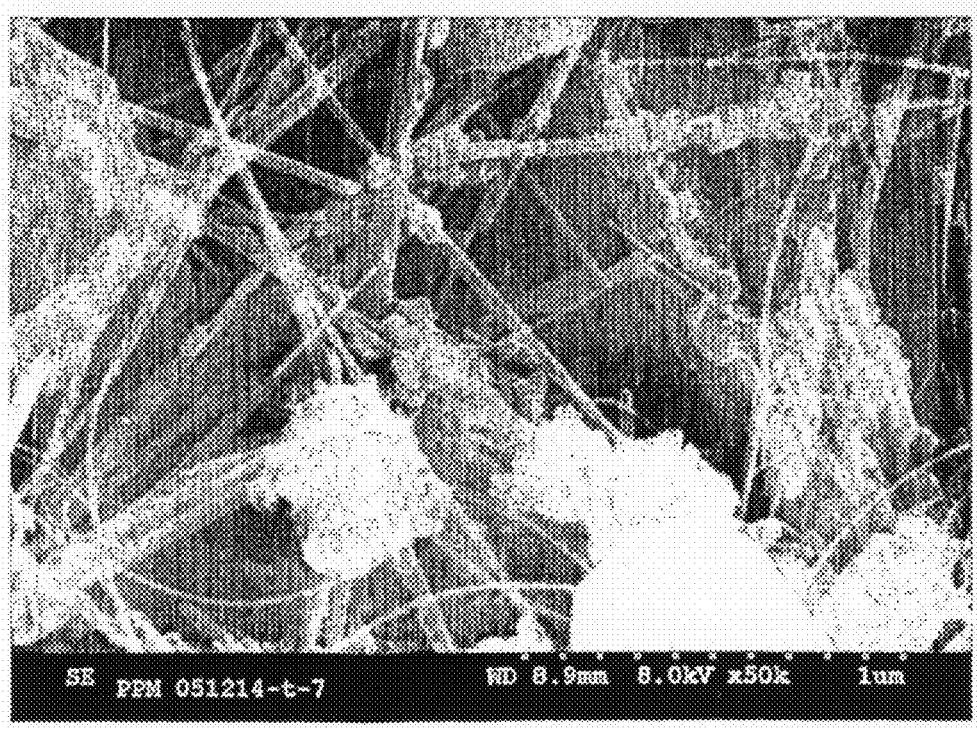
Figure 12E:
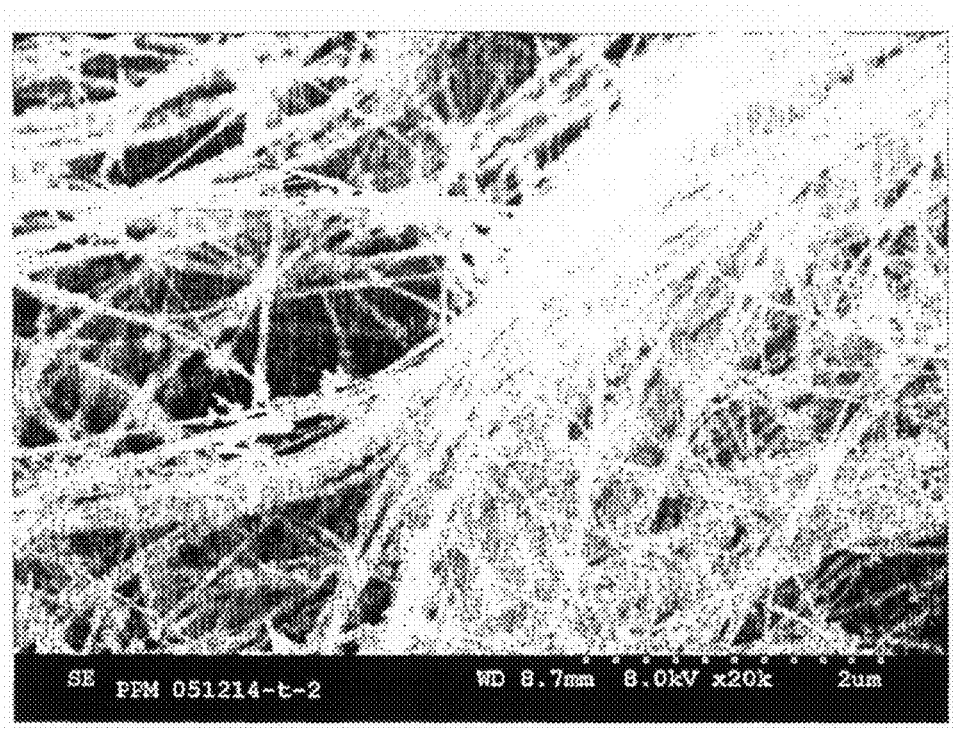
Figure 12F:
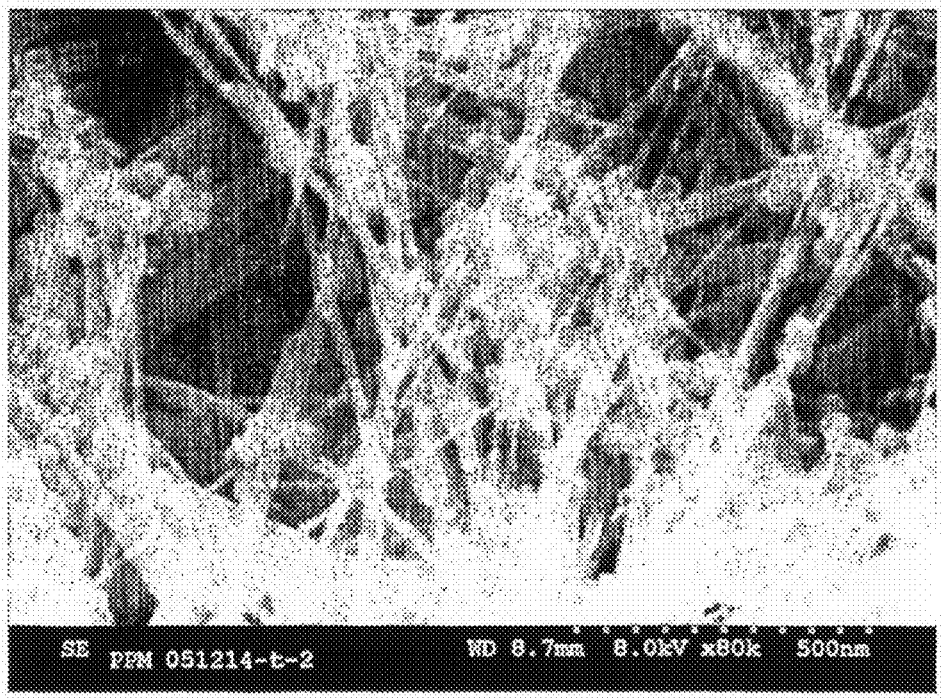
Figure 12G:
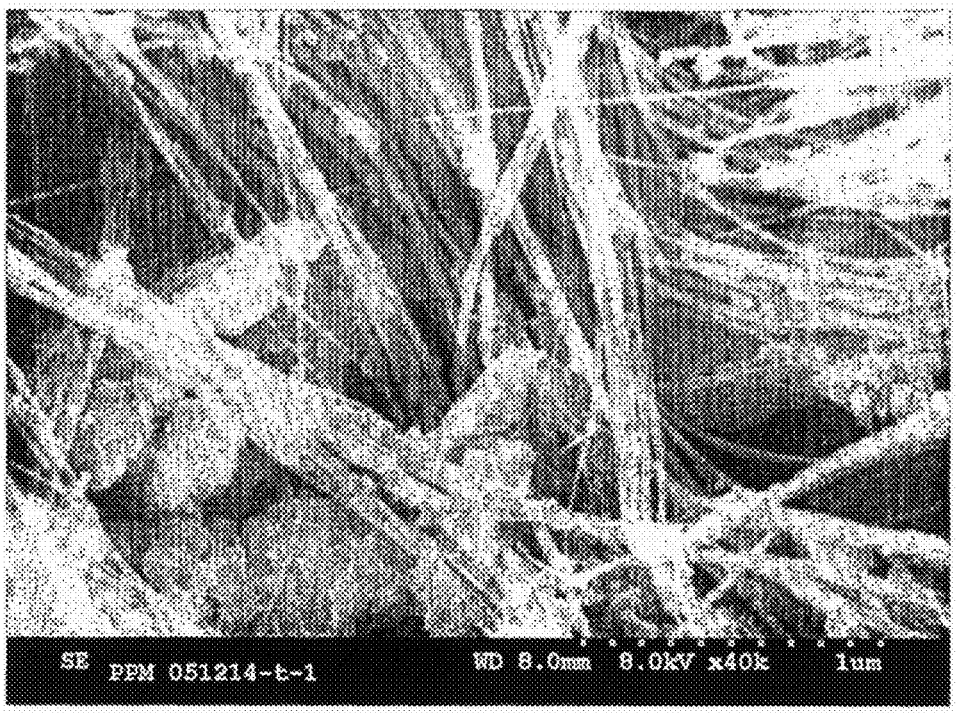
Figure 12H:
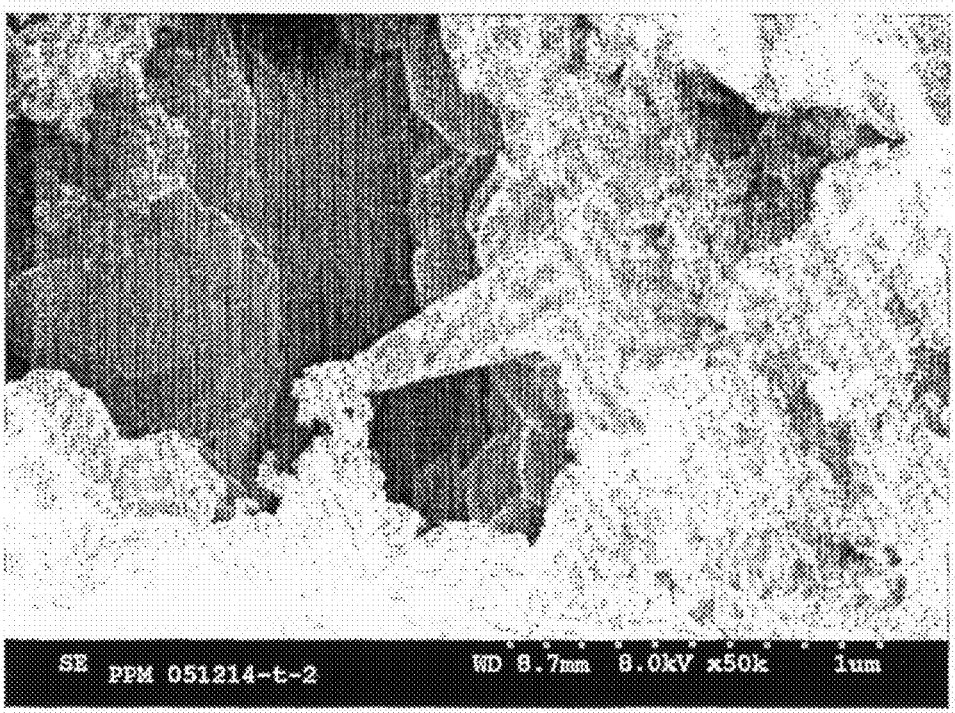
Figure 13:
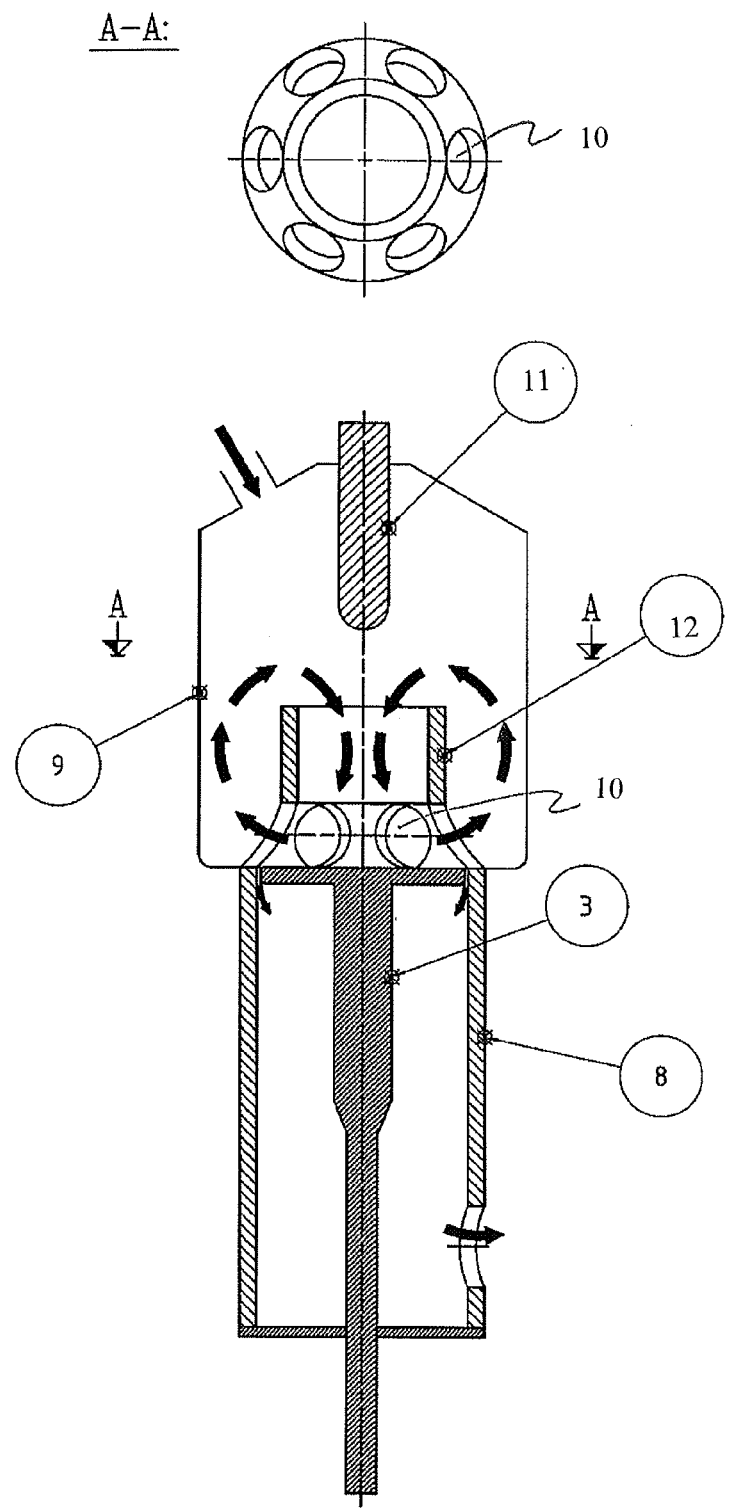
FIG. 13 shows an embodiment of the counter-electrode having a conical shape and holes.
Figure 14:
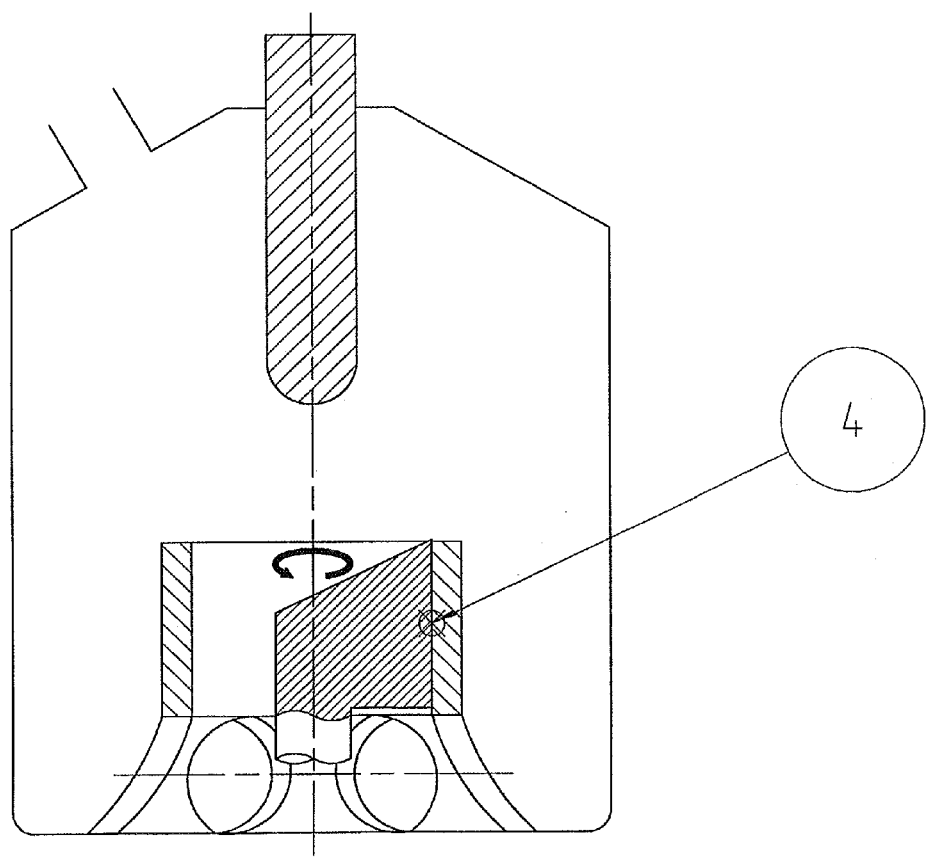
FIG. 14 shows an embodiment of a rotatable scraping mechanism.
Figure 15:
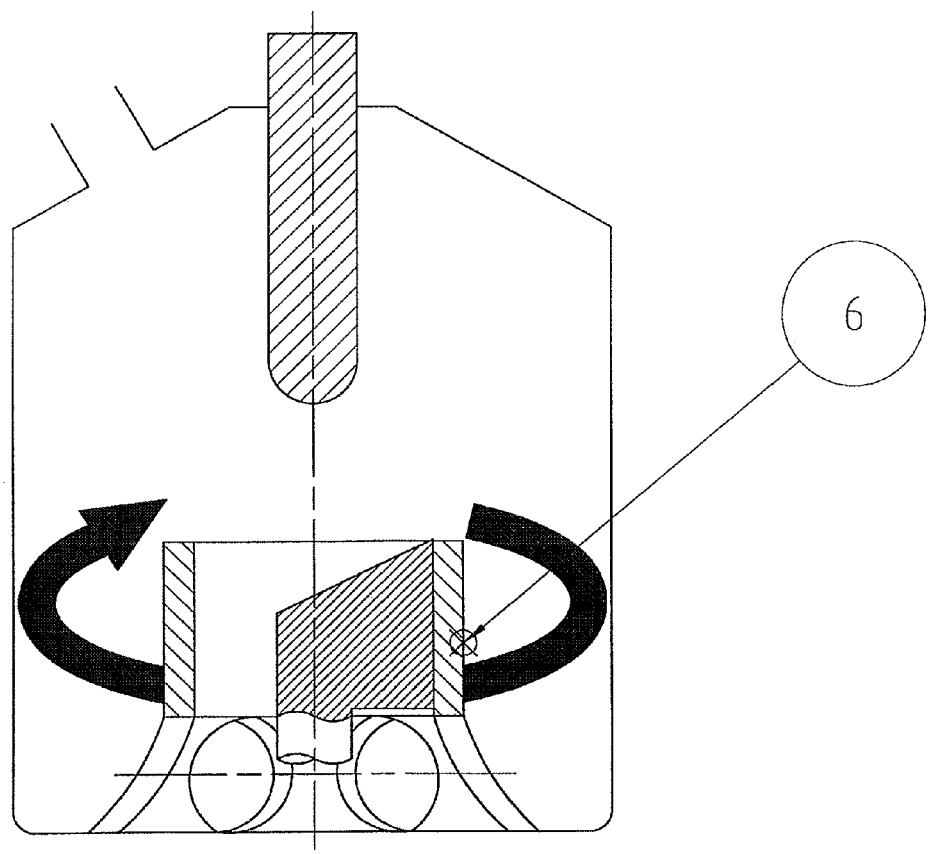
FIG. 15 shows an embodiment of a blowing mechanism.
Figure 16:
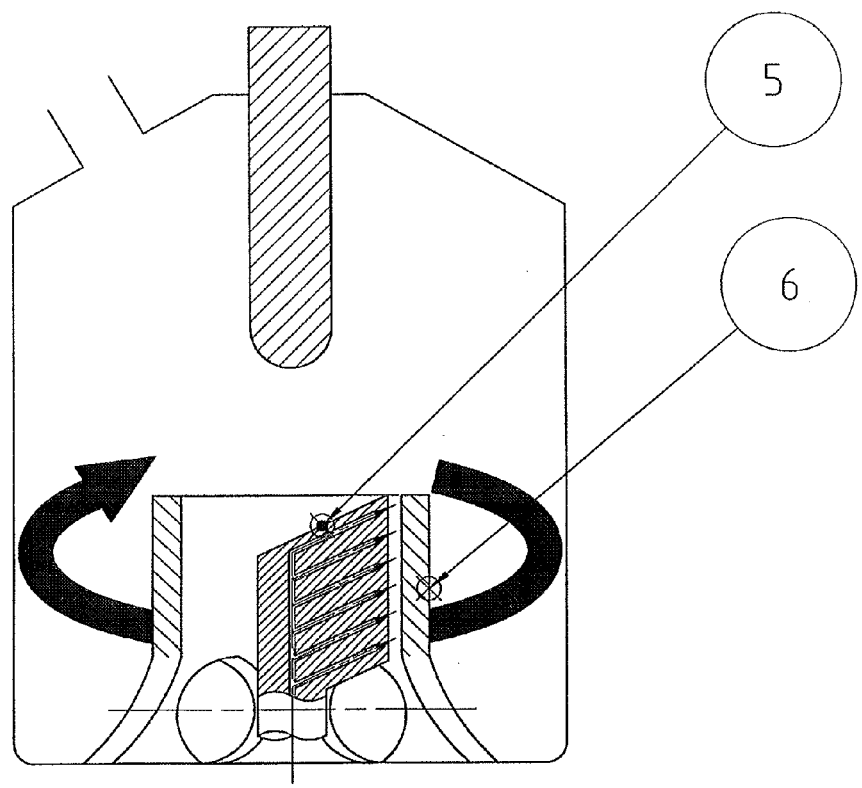
FIG. 16 shows an embodiment of a rotatable counter-electrode.

FIG. 11 a)-c) are FE-SEM images of a cone and carbon nanotubes of experiment 4. FIG. 11a): The image shows a cone in a sample from the anode holes. FIG. 11b): Sample from inside the anode at the top. The image shows carbon nanotubes in a high concentration. FIG. 11c): Sample from inside the anode at the top. Carbon nanotubes with diameters in the range 10-20 nm and length 1-3 µm.

FIG. 12 a)-h) are FE-SEM images of carbon nanotubes and a cone of experiment 5. All these samples were put directly on a carbon tape. FIG. 12a) shows an area with a very high concentration of nanotubes from the radiation shields while b) shows a higher magnification image of nanotubes in a) with d=15-40 nm and length ~2 µm. FIG. 12 c-d) show carbon nanotubes from the substrate where c) gives an overview of an area with nanotubes, while d) shows a higher magnification image of nanotubes with d=10-50 nm and length ~1-5 µm. FIG. 12 e-f) shows carbon nanotubes from the inside cylinder part of the anode (top). The image in e) shows an area with high concentration of nanotubes with d~10-50 nm and length ~1-4 µm, while f) shows a higher magnification image of nanotubes with d~10-50 nm and length ~1 µm. In FIG. 12 g) is shown an image of a sample from the anode top showing carbon nanotubes with d~30 nm and length ~1-5 µm. FIG.

12h): Sample from the anode inside, cylinder part. The image shows a carbon cone with d~350 nm and length ~1 μm.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. Process for producing carbon nanotubes or other carbon nanostructures, comprising:
   evaporating/decomposing a carbon containing material in a voluminous thermal plasma, wherein said voluminous thermal plasma is generated by rotating an electric arc using an externally applied magnetic field, condensing said evaporated/decomposed carbon containing material on surfaces or on particles in a gas flow, and recirculating said carbon containing material through the voluminous plasma.

2. Process according to claim 1, comprising positioning and rotating the arc by adjusting a distribution, direction and strength of the applied magnetic field.

3. Process according to claim 1, wherein the carbon containing material is in gas, liquid or solid state.

4. Process according to claim 1, wherein the carbon containing material is selected from the group consisting of carbon black, graphite powder, coal, natural gas, hydrocarbons and oils.

5. Process according to claim 1, comprising adding a catalyst together with said carbon containing material or with an applied plasma gas.

6. Process according to claim 1, comprising applying a catalyst on said surfaces.

7. Process according to claim 1, wherein the catalyst is selected from the group consisting of Ni, Co, Fe, Y, salts and organometallic compounds of Ni, Co, Fe, Y, suspensions of Ni, Co, Fe, Y and organometallic compounds of Ni, Co, Fe Y and combinations thereof.

8. Process according to claim 1, comprising providing said carbon containing material by adding or by evaporation of carbon containing electrodes.

9. Process according to claim 1, comprising using hydrogen, helium, nitrogen, argon, carbon monoxide or mixtures thereof as plasma gas.

10. Process according to claim 1, wherein the surfaces are either an electrode or a substrate.

11. Process according to claim 1, wherein the electric arc is provided between an electrode and a hollow counter-electrode, wherein the electrodes are axially arranged facing each other.

12. Process according to claim 1, wherein a counter-electrode is provided with holes allowing passage and recirculation of gases and particles.

13. Reactor for producing carbon nanotubes or other carbon nanostructures, by the process according to claim 1, comprising:
   an electrode and a hollow counter-electrode, wherein the electrodes are axially arranged facing each other, and wherein the counter-electrode is provided with holes, allowing passage and recircullation of gasses and particles, said reactor comprising at least one magnet.

14. Reactor according to claim 13, wherein the counter-electrode is a tube.

15. Reactor according to claim 13, wherein the counter-electrode or a part of it has a conical shape.

16. Reactor according to claim 13, wherein the at least one magnet or a part of a single magnet is arranged in a lower part of the reactor, below an arc area, and wherein the at least one magnet or a part of a single magnet is arranged in an upper part of the reactor above the arc area.

17. Reactor according to claim 13, wherein the magnets are electromagnets or permanent magnets.

18. Reactor according to claim 13, comprising a blowing or scraping mechanism for removing carbon nanotubes formed on the counter-electrode.

19. Reactor according to claim 18, wherein said scraping mechanism is provided by a rotatable counter-electrode or a rotatable scraping mechanism.

20. Reactor according to claim 13, comprising at least one injection lance or injection port.

* * * * *